United States Patent
Song et al.

(10) Patent No.: US 11,567,258 B1
(45) Date of Patent: Jan. 31, 2023

(54) STRUCTURES IN OPTICAL DEVICES HAVING GRAPHENE AND MANUFACTURING METHOD FOR THE SAME

(71) Applicants: KOREA INSTITUTE OF SCIENCE AND TECHNOLOGY, Seoul (KR); KOREA INSTITUTE OF MACHINERY & MATERIALS, Daejeon (KR)

(72) Inventors: Yong Won Song, Seoul (KR); Md. Siam Uddin, Seoul (KR); Jiyeon Choi, Daejeon (KR); Sungil Kim, Daejeon (KR); Dohyun Kim, Daejeon (KR)

(73) Assignees: Korea Institute of Science and Technology, Seoul (KR); Korea Institute of Machinery & Materials, Daejeon (KR)

( * ) Notice: Subject to any disclaimer, the term of this patent is extended or adjusted under 35 U.S.C. 154(b) by 0 days.

(21) Appl. No.: 17/665,940

(22) Filed: Feb. 7, 2022

(30) Foreign Application Priority Data

Jul. 7, 2021 (KR) .......................... 10-2021-0089102

(51) Int. Cl.
*G02B 6/02* (2006.01)
*C03C 25/106* (2018.01)

(52) U.S. Cl.
CPC ...... *G02B 6/02295* (2013.01); *C03C 25/1062* (2018.01)

(58) Field of Classification Search
CPC .......................... G02B 6/02295; C03C 25/1062
USPC .......................................................... 385/123
See application file for complete search history.

(56) References Cited

U.S. PATENT DOCUMENTS

| 9,891,380 B1* | 2/2018 | Winarski | ................ D01F 11/10 |
| 2019/0027889 A1* | 1/2019 | Song | ..................... H01S 3/0092 |

FOREIGN PATENT DOCUMENTS

| CN | 105467509 B | * | 5/2018 | ......... G02B 6/02328 |
| KR | 10-1028803 B1 | | 4/2011 | |

\* cited by examiner

*Primary Examiner* — Sung H Pak
(74) *Attorney, Agent, or Firm* — Rabin & Berdo, P.C.

(57) ABSTRACT

The present disclosure discloses an optical device structure including an optical fiber including a core part, a clad part, and a three-dimensional micro hole structure in the clad part, wherein a surface of the three-dimensional micro hole structure is provided with at least a non-flat surface, and a conformal graphene layer is formed on the surface of the three-dimensional micro hole structure, and a method of manufacturing the same.

13 Claims, 10 Drawing Sheets

STRUCTURES IN OPTICAL DEVICES HAVING GRAPHENE AND MANUFACTURING METHOD FOR THE SAME

CROSS-REFERENCE TO RELATED APPLICATION

This application claims priority to and the benefit of Korean Patent Application No. 2021-0089102, filed on Jul. 7, 2021, the disclosure of which is incorporated herein by reference in its entirety.

BACKGROUND

1. Field of the Invention

The present disclosure relates to an optical device, and more specifically, to an optical device structure in which a graphene layer is directly formed along a surface of a three-dimensional micro hole structure in an optical fiber provided with the three-dimensional micro hole structure in a clad part and a method of manufacturing the same.

2. Discussion of Related Art

It is reported that semiconductors manufactured using silicon have reached the limit in terms of degree of integration and processing speed.

For example, when a line width is controlled up to 10 nm for miniaturization of a central processing unit (CPU) manufactured using silicon, the effectiveness of the central processing unit is rapidly reduced due to distorted electromagnetic characteristics. Further, when a microelectronic device is manufactured by grafting nanotechnology, the operation stability of the device is deteriorated, and manufacturing costs are increased.

Accordingly, research for improving a data processing speed and quality using an optic having a wide bandwidth has actively proceeded. The optic can reduce an amount of heat generated by components and can minimize interference when transmitting or receiving a large amount of data. Here, an ultrafast laser pulse greatly contributes to multiplexing and development of ultrafast switches, which are important when processing large-capacity optical signals. The ultrafast laser pulse provides high quality such as a pulse width, peak power, and the like which cannot be compared with signals formed by general continuous wave (CW) modulation.

Meanwhile, in order for graphene to be inserted into a laser resonator (cavity) and used as a saturable absorber, a certain portion of an optical fiber should be coated, and there was a technology for applying this coating to an end surface of the optical fiber. According to this technology, after coating the graphene on the end surface of the optical fiber, the end portions of other optical fibers are connected (in this case, a portion referred to as a ferrule is attached for easy manual operation.) to maintain continuity of the entire laser resonator. In this case, a progressing laser directly penetrates the graphene layer and causes a nonlinear interaction. In this 'direct penetration' method, a strong nonlinear interaction can be performed, but the graphene is damaged and lost by the laser when a high-power laser is operated. Since the power of a laser which can thermally damage carbon nanomaterials is about 15 dBm (~30 mW) or more, in the case of a high-power laser which exceeds this power range, a bypass method is required rather than an interaction by direct penetration.

In addition to the above-described 'direct penetration' method, there is a method capable of obtaining a desired laser pulse even when only a part of an evanescent field of the progressing laser interacts with the graphene.

To this end, there was a method of manufacturing a saturable absorber by removing one surface of an optical fiber clad to generate a surface close to a core (this referred to as a D-shaped optical fiber) and transferring the graphene thereon.

However, a mechanical process or a manual operation of the D-shaped optical fiber has problems of not only (i) the impossibility of reproduction, but also (ii) the shortest distance to the core (the closer to the core, the stronger the interaction, but the unnecessary strong absorption by the graphene occurs), and (iii) a rough surface state (which becomes a variable of scattering loss) after the process, and specifically, there was a problem in that strong absorption in the high-power laser causes a photo-thermal effect in the graphene, which causes thermal damage.

Meanwhile, graphene formation according to the related art undergoes a process of synthesizing the graphene on a catalyst metal, and then transferring the graphene onto a target substrate. When the graphene is transferred to an integrated device due to recent scale down of an electronic device or an optical device, it was very difficult to selectively transfer and coat the graphene only where necessary.

Further, the graphene is properly formed only on a flat surface, but is not properly formed even in a narrow region such as a relatively sharp groove, an edge, or the like, and thus is difficult to be applied to various optical devices.

PRIOR-ART DOCUMENT

Patent Document (Patent Document 1) Korean Patent Registration No. 10-1028803

SUMMARY OF THE INVENTION

The present disclosure is directed to implementing a graphene layer (conformal graphene layer) directly synthesized along a surface of a structure in a non-flat three-dimensional micro hole structure including an optical fiber.

Also, the present disclosure is directed to enabling optimization of a depth, a length, and a surface state in manufacture of an optical fiber structure coated with a conformal graphene layer.

Also, the present disclosure is directed to inducing an efficient nonlinear interaction of laser-graphene through optimization of an optical fiber structure coated with a conformal graphene layer, and then performing a pulsed operation of a high-power laser through this.

One aspect of the present disclosure provides an optical device structure including an optical fiber including a core part, a clad part, and a three-dimensional micro hole structure in the clad part, wherein a surface of the three-dimensional micro hole structure is provided with at least a non-flat surface, a conformal graphene layer is formed on the surface of the three-dimensional micro hole structure, the conformal graphene layer is formed by nucleation and growth on the surface of the micro hole structure through decomposition of a carbon precursor, and the carbon precursor is supplied with energy of a metastable atom of a catalyst non-metal layer, and is decomposed into carbon atoms to be provided to a surface of the previously-formed micro hole structure of the optical device.

Preferably, a shape of the three-dimensional micro hole structure, a distance between the three-dimensional micro hole structure and the core part, and/or the surface on which the conformal graphene layer is formed may be controlled to optimize a nonlinear interaction between a laser which proceeds along the core part of the optical fiber and the conformal graphene layer coated on the surface of the three-dimensional micro hole structure.

According to the present disclosure, a microstructure may be reproducibly manufactured on the optical fiber by departing from a mechanical process problem, for example, by introducing a femtosecond laser-induced selective etching (FLSE) technology, and a structure capable of acquiring a necessary nonlinear interaction while minimizing losses due to absorption and scattering may be optimized by precisely controlling the shape of the three-dimensional micro hole structure, the distance between the core and the structure, and/or the surface. The conformal graphene layer may be successfully synthesized in a derived optimized structure of the three-dimensional micro hole structure by introducing a process in which graphene may be directly formed without a transfer process.

Preferably, the three-dimensional micro hole structure may include a first hole formed in a surface of the optical fiber and a second hole connected to the first hole and adjacent to the core part, and the second hole may occupy a smaller region than the first hole. Structures of these first hole and second hole become effective structures for smooth synthesis of the graphene. Meanwhile, additional holes other than the first hole and the second hole may be formed in the clad part of the optical fiber.

Preferably, the three-dimensional micro hole structure may be additionally provided with an optical component therein.

Preferably, the three-dimensional micro hole structure may be composed of a plurality of small holes, and the graphene layer may be provided on surfaces of the plurality of small holes and thus a grating device may be implemented.

Meanwhile, the conformal graphene layer may function as a saturable absorber.

Further, the optical device structure may function as a passive mode locker configured to fix relative phases of laser modes which proceed in a laser resonator (laser cavity), and may generate a pulse in femtosecond ($10^{-15}$ second) units.

Another aspect of the present disclosure provides a method of manufacturing an optical device structure, including: disposing an optical fiber including a core part, a clad part, and a three-dimensional micro hole structure in the clad part; forming a graphene layer on a surface of the three-dimensional micro hole structure, which is an operation of forming a non-metal layer on a dummy substrate; disposing the optical fiber so that the non-metal layer on the dummy substrate faces the three-dimensional micro hole structure; and synthesizing a graphene film by injecting a carbon precursor to form graphene on the surface of the three-dimensional micro hole structure, wherein nucleation and growth of the graphene is performed on a surface of an application target of the graphene through decomposition of the carbon precursor, the carbon precursor is supplied with energy of a metastable atom of the non-metal layer for decomposition, and is decomposed into carbon atoms on a surface of the non-metal layer to form the graphene due to supply thereof, the surface of the three-dimensional micro hole structure is provided with at least a non-flat surface, and a conformal graphene layer is grown on the surface of the three-dimensional micro hole structure.

Preferably, the dummy substrate may be a silicone substrate in which a V-shaped groove is formed, and the non-metal layer is formed on a surface of the V-shaped groove.

Preferably, the non-metal layer may be made of gamma ($\gamma$) alumina ($Al_2O_3$).

BRIEF DESCRIPTION OF THE DRAWINGS

The patent or application file contains at least one drawing executed in color. Copies of this patent or patent application publication with color drawings will be provided by the Office upon request and payment of the necessary fee.

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Advantages and features of the present disclosure which are described in the specification, and a method of achieving them will be apparent with reference to embodiments which are described later in detail in conjunction with the accompanying drawings. However, the present specification is not limited to the embodiments which will be disclosed later, but may be implemented in various different forms, and only the present embodiments allow the disclosure of the present specification to be complete, and the embodiments are only provided so that the disclosure of the present specification is complete, and to fully inform those of ordinary skill in the art to which this specification belongs (hereinafter, referred to as 'those skilled in the art'), and the scope of the present specification is only defined by the scope of the claims.

Figure 1:
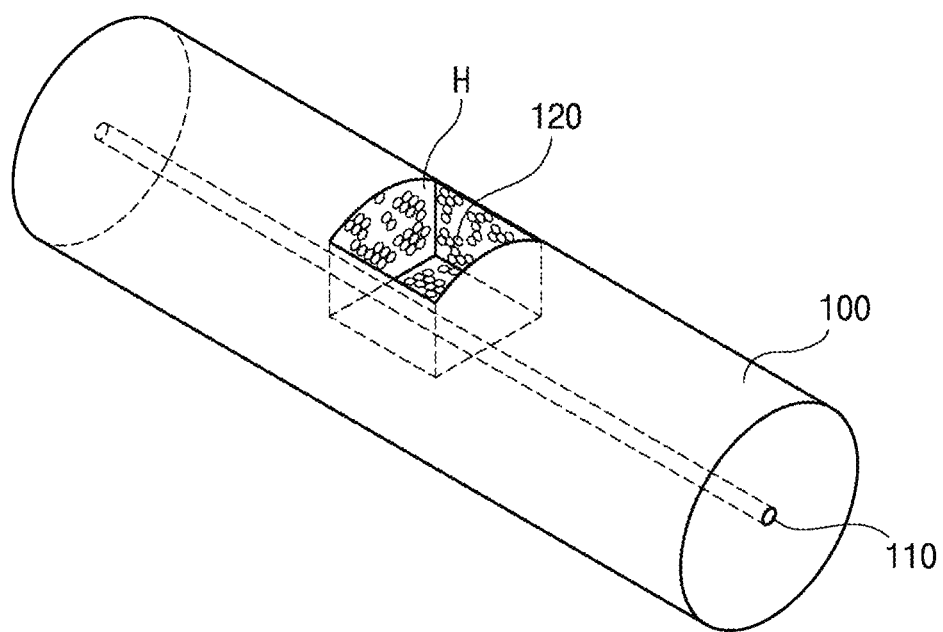
FIG. 1 illustrates a schematic partial perspective view of an optical device according to a first embodiment of the present disclosure.

FIG. 1 illustrates a schematic partial perspective view of an optical device according to a first embodiment of the present disclosure. A structure of the optical device in FIG. 1 is only for exemplifying the present disclosure, and the present disclosure is not limited thereto.

Referring to FIG. 1, an optical device structure includes a three-dimensional micro hole structure H formed in a clad part 100 in an optical fiber including a core part 110 and the clad part 100. Further, the surface of the three-dimensional micro hole structure H includes a graphene layer 120. The optical device structure may have various types that are not particularly limited such as an optical device itself, a component of an optical device constituting the optical device by including other components, and the like.

A surface of the three-dimensional micro hole structure H includes at least a non-flat surface, and a conformal graphene layer is formed on the surface of the three-dimensional micro hole structure H. The conformal graphene is formed by nucleation and growth on the surface of the structure through decomposition of a carbon precursor, and the carbon precursor is supplied with energy of metastable atoms of a non-metal layer used as a catalyst layer and is decomposed into carbon atoms on a surface of the non-metal layer to form graphene. A detailed method of forming the conformal graphene will be described later in detail.

The graphene layer 120 formed in the three-dimensional micro hole structure H may function as, for example, a saturable absorption material. Due to the saturable absorption material, light of weak intensity is absorbed by the saturable absorption material, and light of strong intensity passes through the saturable absorption material. In the case of a laser, a phase between modes passing through the saturable absorption material is uniformly specified, and accordingly, periodic constructive and destructive interference between the modes occurs to passively form a pulsed laser. Specifically, when the saturable absorption material is a nanomaterial, since the saturable absorption material may be inserted into a desired site in a laser resonator, system integration may be advantageous and a process may be simplified. Further, since the nanomaterial with high non-linearity may minimize a width of the pulse, high quality pulses may be generated.

The graphene may function as the saturable absorption material which satisfies all of these conditions. When a saturation absorption characteristic of graphene is realized, a femtosecond ($10^{-15}$ seconds) laser pulse may be generated.

In the graphene, the carbon atoms are regularly arranged in a two-dimensional order. The graphene has a point bandgap structure in which the bandgap between energy bands is 0, and thus may absorb light in a wide wavelength range without limitation of a wavelength. Accordingly, a wideband optical signal may be smoothly generated or processed.

The three-dimensional micro hole structure H is manufactured by deforming the clad part 100 of the optical fiber using, for example, a laser. A specific manufacturing method will be described later. The three-dimensional micro hole structure H may be manufactured in various shapes which are not particularly limited.

According to one embodiment of the present disclosure, the three-dimensional micro hole structure H of the present disclosure may have at least a quadrangular corner, an inclined surface, a narrow hole region, a protruding edge, and the like in addition to a general flat surface. In a general graphene transferring method, a region to be coated with the graphene should be flat, and it is impossible to transfer graphene to the above-described complicated surface, but according to the embodiment of the present disclosure, a graphene layer may also be formed in this region. According to one example, as shown in FIG. 1, the three-dimensional micro hole structure H is a rectangular parallelepiped-shaped hole, and may be a structure having a flat quadrangular surface at the bottom, and having surfaces vertical to corners of each quadrangular surface.

A case in which the three-dimensional micro hole structure H has diversified shapes and is finer may bring good application ability in the manufacture of the optical device structure. For example, in a pulse device using the optical fiber, there has been a continuous effort to find a technology for including nonlinear nanomaterials in a laser resonator which generates a pulse based on a high intensity nonlinear interaction. However, despite these efforts, acquiring high energy pulses in femtosecond units was still a great challenge due to optical loss and nanomaterial loss in the nonlinear nanomaterial itself.

According to one embodiment of the present disclosure, the optical loss caused by the nonlinear interaction between laser-graphene and the nanomaterial may be precisely controlled to secure a high energy pulse train in femtosecond units by forming a fine three-dimensional micro hole structure and manufacturing the conformal graphene layer on the surface.

Next, a method of forming the graphene layer will be described.

In a method of directly synthesizing the graphene on the surface of an application target of the graphene, a non-metal layer used as a catalyst is formed, a target surface (for example, the three-dimensional micro hole structure) on which the graphene is formed is disposed in a space opposite the non-metal layer, and a graphene layer is synthesized by growing the graphene on the target surface.

The non-metal layer may have metastable atoms having an excellent function as a catalyst. The non-metal layer may have a phase which exhibits catalytic activity capable of growing higher-quality graphene better. In one embodiment, the non-metal layer may be made of gamma (γ) alumina. The non-metal layer made of the gamma (γ) alumina has an Alm site and thus has excellent catalytic characteristics and may serve as an excellent catalyst for synthesis of the graphene.

A precursor for the growth of the non-metal layer may include any one aluminum precursor selected from the group consisting, for example, trimethyl aluminum (TMA, $(CH_3)_3Al$), aluminum isoproxide ($[Al(OC_3H_7)_3]$, IPA), methyl-pyrolidine-tri-methyl aluminum (MPTMA), ethyl-pyridine-triethylaluminum (EPPTEA), ethyl-pyridine-dimethyl-aluminum hydridge (EPPDMAH), alane ($AlH_3$), and a combination thereof.

Subsequently, the target substrate is disposed in a space to face the non-metal layer. Further, a process of introducing the carbon precursor into a reactor and decomposing the carbon precursor to grow the graphene on the surface of the target substrate is included. The graphene may be grown using chemical vapor deposition (CVD).

A carbon source is a precursor of graphene synthesis, and various materials capable of growing graphene using CVD may be used. In one embodiment, the carbon precursor may be any one selected from the group consisting of methane, ethane, propane, acetylene, methanol, ethanol, propanol, and a combination thereof.

A reaction gas may include an ambient gas together with the carbon precursor, and the ambient gas may be an inert gas. In one embodiment, the inert gas may be argon. In another embodiment, the inert gas may be any one selected from the group consisting of nitrogen, helium, neon, argon, hydrogen, and a combination thereof.

The non-metal layer may grow the graphene on the target surface without a separate metal catalyst.

In one embodiment, the carbon atoms constituting the graphene layer are included in the reaction gas, and thus the carbon precursor introduced into the reactor is decomposed by interaction with the non-metal layer and anchored on the surface, and nucleation and growth of the graphene crystal may be achieved by anchorage of the carbon atoms. Here, the decomposition by the interaction between the carbon precursor and the non-metal layer is performed by dissociative adsorption when the surface energy of metastable atoms of the non-metal layer is supplied to the carbon precursor. When the carbon precursor is methane ($CH_4$), hydrogen atoms should be separated from the carbon atom so that the carbon atom is produced. In order to separate the hydrogen atoms from the carbon atom, energy greater than or equal to a certain energy barrier is required, and the gamma (γ) alumina constituting the non-metal layer functions as a catalyst to assist generation of the carbon atom.

When methane is supplied to the gamma (γ) alumina, methane may anchor on the surface of the non-metal layer made of the gamma (γ) alumina. Methane may be more easily separated into the carbon atom and the hydrogen atoms by receiving activation energy from the anchoring surface. The separation of the carbon atom and the hydrogen atoms may be more smoothly performed at the $Al_{III}$ site.

Figure 2:
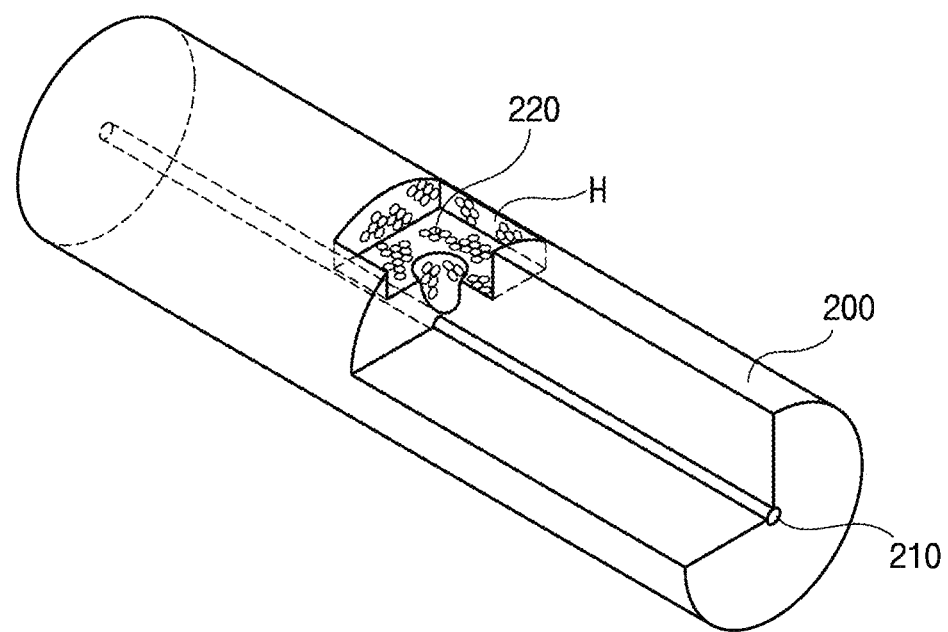
FIG. 2 illustrates a schematic partial perspective view of an optical device according to a second embodiment of the present disclosure.

FIG. 2 illustrates a schematic partial perspective view of an optical device according to a second embodiment of the present disclosure.

An optical device structure includes a three-dimensional micro hole structure H formed in a clad part 200 in an optical fiber including a core part 210 and the clad part 200. Further, the surface of the three-dimensional micro hole structure H includes a graphene layer 220.

For convenience of description, differences from the first embodiment will be mainly described. The differences from the first embodiment are in the shape of the three-dimensional micro hole structure.

The three-dimensional micro hole structure includes a first hole formed in the surface of the optical fiber and a second hole connected to the first hole and adjacent to the core part, and the second hole may occupy a smaller region than the first hole. According to one example, as shown in FIG. 2, the first hole may be a rectangular parallelepiped-shaped hole. The second hole may be formed in a direction toward the core part 210 from a partial area of a lower surface of the rectangular parallelepiped shape, and may have a conical shape with a diameter decreasing in the direction toward the core part 210.

Advantages of this three-dimensional micro hole structure will be described in detail in the following Experimental Example.

(Experimental Example)

FIGS. 3A to 3D are views for describing a manufacturing flow chart of an optical fiber microstructure according to Experimental Example of the present disclosure.

Figure 3A:
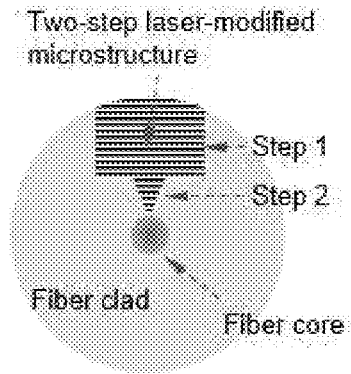
FIGS. 3A to 3D are views for describing a manufacturing flow chart of an optical fiber microstructure according to Experimental Example of the present disclosure.

FIG. 3A is a view illustrating a process of manufacturing the three-dimensional micro hole structure in the optical fiber in two operations according to Experimental Example of the present disclosure. The three-dimensional micro hole structure is manufactured by modifying physical properties of a target region by a laser scribing process on the target region in a clad of the optical fiber and intensively etching the target region. In laser scribing, pulses output from a focused ultrafast femtosecond laser are provided on the optical fiber to modify a material structure for efficient selective etching.

The three-dimensional micro hole structure is manufactured from the surface of the optical fiber in the clad in a shape having an empty space of 50×50 $\mu m^2$ and a depth of 30 μm as the first hole. Further, the second hole 22 μm in length is manufactured with a starting diameter of 17 μm from a center of the first hole and approaches a vicinity of the optical fiber core.

Main advantages of the three-dimensional micro hole structure having such a plurality of holes in the structure shown in FIG. 2 are as follows. First, in order to increase the interaction between the laser and the graphene coated on a surface of the hole, since a design allows for elongating a micro hole to a region adjacent to the optical fiber core, by allowing a wide range of modifications to depth control of the hole, it is possible to control the interaction between the laser and the graphene formed on the surface of the hole. Second, a wide region of the first hole helps an etchant to be sufficiently delivered into a narrow hole to smoothly form the second hole having a high aspect ratio finally. Third, this structure not only has a large opening for a synthesis process, but also has an effect of minimizing an unnecessary increase in dimensions due to wet etching. Fourth, a distance from the micro hole which becomes shorter as an opening of a cavity becomes wider helps movement of the carbon atoms diffused in the micro hole structure, and thus growth of the graphene with higher quality is enabled.

Further, the laser scribing process provides versatility of realizing complex microstructures by allowing accuracy to be adjusted with control of laser output characteristics.

The three-dimensional micro hole structure may be variously designed by adjusting a shape for securing a minimum interaction between the graphene layer and the laser and the like to ensure a distance between the core and a tip of the second hole, regions of the first hole and the second hole, a shape of the structure, and an effective saturable absorber operation.

Figure 3B:
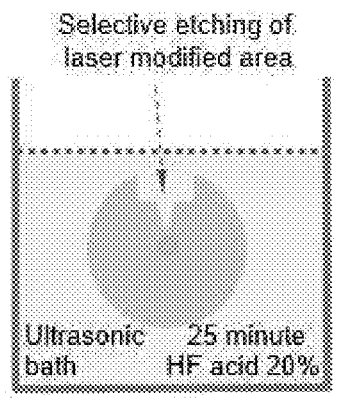

FIG. 3B illustrates a process of etching the micro hole structure by inputting the optical fiber of which properties have been selectively changed in an operation in FIG. 3A into an etching solution. The etching was performed for 25 minutes with a 20% HF acid solution.

Figure 3C:
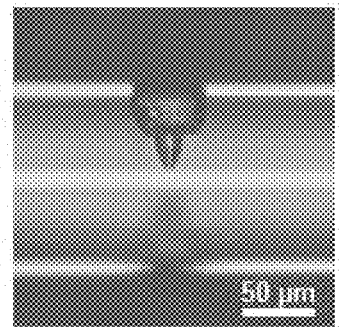

FIG. 3C illustrates a two-step structure of the three-dimensional micro hole structure according to Experimental Example of the present disclosure, and illustrates a situation in which the tip of the second hole is elongated to the core part.

In this case, since this device includes the second hole tip in a laser evanescent wave, a nonlinear interaction between the laser and the graphene may be possible, and optical loss may be minimized by adjusting a shape, a depth and a surface state of the second hole tip.

The insertion loss of the device manufactured under an optimized process was 1.1 dB. This low loss is advantageous for maximizing power in the laser resonator. Accordingly, high energy output pulses may be secured.

Figure 3D:
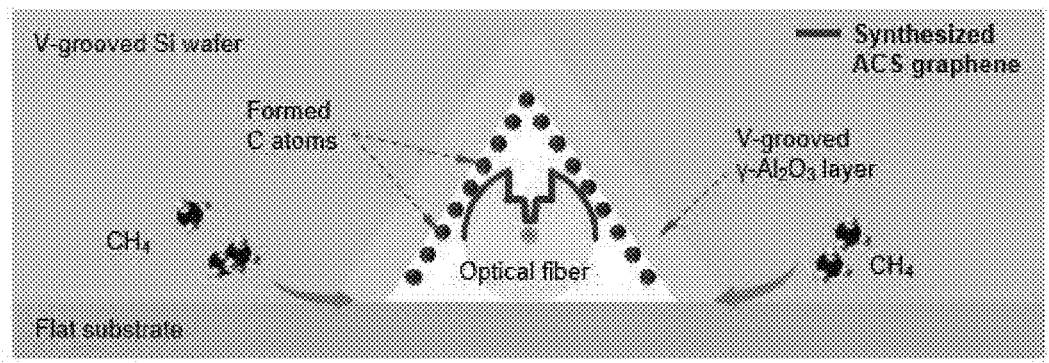

FIG. 3D illustrates a process of growing a conformal graphene layer on the three-dimensional micro hole structure.

The growth process is initiated by highly reactive Al sites on a catalyst γ-$Al_2O_3$ surface at elevated temperatures. A catalyst γ-$Al_2O_3$ layer is previously deposited on a V-grooved silicon substrate.

At the center of this growth process, C atoms are generated from decomposition of $CH_4$ molecules, which are precursors with low activation energy, at reaction sites developed on the catalytic γ-Al$_2$O$_3$ surface.

The generation of C atoms at the reactive sites dispersed over the entire surface of γ-Al$_2$O$_3$ is interpreted by the Arrhenius formula in that the C atoms diffuse to the surface of an adjacent target base material and graphene nucleation and growth proceed, and a concentration gradient of the C atoms between the catalytic γ-Al$_2$O$_3$ surface and the adjacent target surface is generated.

A density gradient becomes a driving force for spatial diffusion of individual C atoms toward the surface of the adjacent base material, which is explained by Fick's law:

$$j = -D \frac{\partial c}{\partial x}.$$

Here, D and c denote a diffusion coefficient and concentration of the C atoms, respectively.

This spatial diffusion of the C atoms is expressed as atomic carbon spray (ACS), and the target surface should be located within a critical distance (experimentally less than or equal to a millimeter) from the surface of the catalyst. This ensures the necessary amount of C atoms for the nucleation and growth of the graphene.

Accordingly, a V-groove structure which is previously deposited with γ-Al$_2$O$_3$ was manufactured to secure a significant distance for spatial diffusion of the C atoms, and may help the growth of the graphene in a cylindrical shape of the optical fiber.

Access to oxygen, which may degrade the quality of a graphene crystal, is limited by disposing a flat tray under the V-groove.

In nucleation sites on the target surface, since sp$^2$-hybridized C atoms are firmly fixed together, graphene nuclei are attached to the target surface, and the graphene nuclei gradually grow to form a graphene layer by the ACS.

FIG. 3D shows three-dimensional surfaces of the three-dimensional micro hole structure coated with the conformal graphene layer, and it is possible to directly synthesize graphene even at the tip of the hole, which may not be secured by conventional graphene transfer.

This ACS process suggests that various applications may be performed when the complicated optical device and electronic device are coated with the conformal graphene layer.

Subsequently, the graphene layer grown on the surface of the three-dimensional micro hole structure by the ACS was analyzed using scanning electron microscopy (SEM), energy-dispersive X-ray spectroscopy (EDS), X-ray photoelectron spectroscopy (XPS), and Raman spectroscopy. A case in which the graphene is formed on the surface of the three-dimensional micro hole structure of the optical fiber is referred to as an optical fiber structure for convenience of description.

FIGS. 4A to 4F are photographs and graphs of analyzing the graphene layer grown according to Experimental Example of the present disclosure.

Figure 4A:
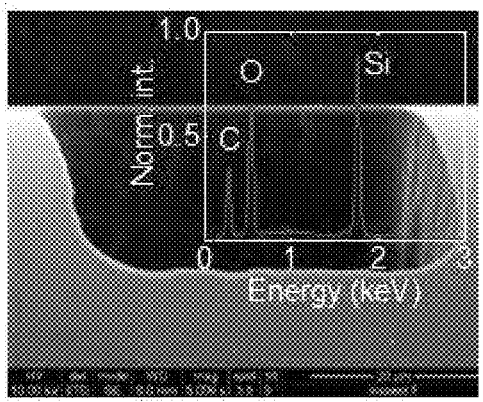
FIGS. 4A to 4F are photographs and graphs of analyzing a graphene layer grown according to Experimental Example of the present disclosure.

FIG. 4A illustrates a scanning electron microscope (SEM) image of the optical fiber structure coated with the graphene. An energy dispersive spectroscopy (EDS) signal measured from a sample indicates an analysis result of chemical constituents from the three-dimensional micro hole structure.

A C/O atom ratio increased from 0.24% to 21.56% before and after synthesis by the synthesis process, which may be seen as successful diffusion of the C atoms in the optical fiber structure manufactured by the ACS method.

Figure 4B:
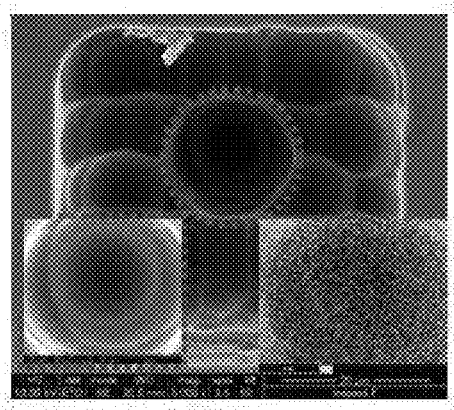

A photograph observed from an upper direction of the optical fiber structure is shown in FIG. 4B. A micro hole is indicated by a red dotted circle. The lower left drawing in FIG. 4B is an enlarged SEM image of the hole region, which proves that no notable light scattering points occurred on the surface after the ACS process.

Quantitative analysis of the carbon distribution in the lower surface of the micro hole was performed through elemental mapping of EDS. Selective mapping of carbon, which is the lower right drawing in FIG. 4B, clearly confirms a result of uniform distribution over the entire surface. This ensures low scattering loss of the laser.

A center-to-edge concentration gradient seen in the mapping is caused by a non-uniform distance from a fixed EDS signal detector.

Figure 4C:
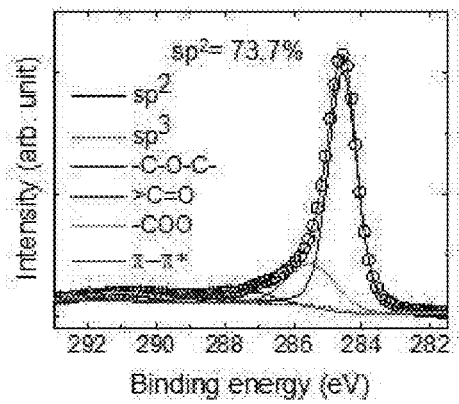

A detailed component analysis result for the surface of the three-dimensional micro hole structure coated with ACS graphene based on X-ray photoelectron spectroscopy (XPS) measurement is shown in FIG. 4C.

A narrow peak of Cl may be deconvoluted into five constituent peaks, which are respectively =C=C= (sp$^2$-hybridized carbon atoms, 284.56 eV), ≡CC≡ (sp$^3$-hybridized carbon atoms, 285.56 eV), a —COC— group (ether and epoxy, atoms, 287.05 eV), a =C=O group (carbonyl, 288.3 eV), and a —COO group (ester and carboxyl, 290.9 eV).

Analysis of sp$^2$ binding calculated as 73.7% as well as an sp$^2$/sp$^a$ ratio of 4.45 from the XPS measurement provides sufficient information for successful formation of the graphene layer from the ACS process. An atomic concentration calculated from the XPS measurement showed that C:O was 1:0.06.

Subsequently, the characteristics of the optical fiber microstructure were examined by a Raman spectrum.

Figure 4D:
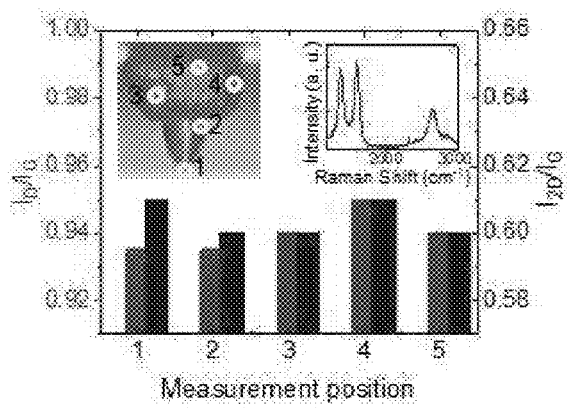

As shown in FIG. 4D, the Raman spectrum was measured at points indicated by yellow circles on a micrograph shown in the drawing inserted into an upper left side.

Three characteristic peaks in the spectrum shown in the drawing inserted into an upper right side in FIG. 4D are a D-band at 1352 cm$^{-1}$, a G-band at 1600 cm$^{-1}$, and a 2D-band at 2700 cm$^{-1}$, respectively, and prove the presence of the graphene in the three-dimensional micro hole structure.

In FIG. 4D, an intensity ratio ($I_D/I_G$) of the D and G peaks and an intensity ratio of the 2D and G peaks ($I_{2D}/I_G$) measured through the Raman spectrum are shown in red and blue bar graphs, respectively.

Figure 4E:
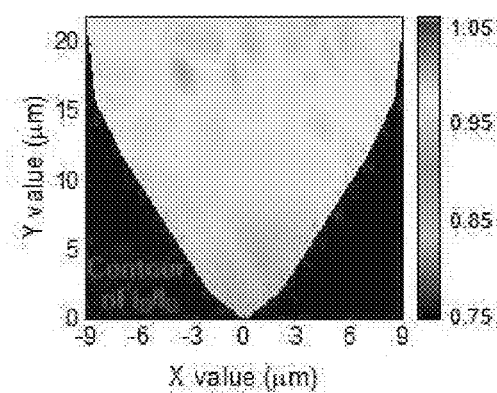
Figure 4F:
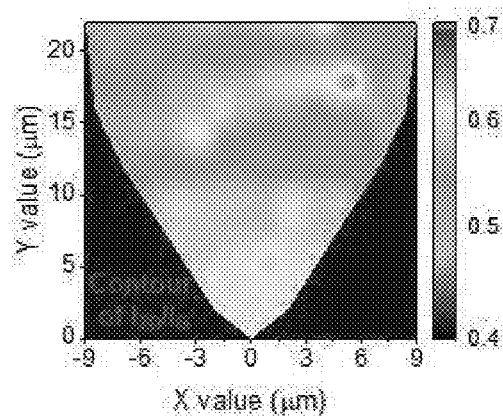

FIGS. 4E and 4F respectively illustrate mapping of $I_D/I_G$ and mapping of $I_{2D}/I_G$. Average values of the peak ratios of $I_D/I_G$ and $I_{2D}/I_G$, respectively, are 0.96 and 0.6.

These results demonstrate conformal coverage of the three-dimensional micro hole structure having ACS-grown graphene without fatal inhomogeneity.

These maps indicate that a tip portion of the micro hole is partially covered with higher quality graphene when analyzed with the above ratios ($I_D/I_G$ and $I_{2D}/I_G$ are 0.94 and 0.61, respectively). This is described by a heterogeneous nucleation mechanism described by the following equation.

$$N_{het} = f \cdot c \cdot \exp\left(-1 \frac{\Delta G_{het}}{kT}\right)$$

Here, f, c, T, and $\Delta G_{het}$ refer to a vibration constant, the number of atoms which come into contact with heterogeneous nucleation sites per unit volume, temperature, and activation energy, respectively.

Due to a high surface-to-volume ratio at the tip portion of the micro hole, the activation energy $\Delta G_{het}$, which promotes the nucleation of the graphene in the corresponding region, decreased. This promotes a process of easy nucleation and growth which enables high-quality graphene.

FIGS. 5A to 5E are a laser setup employing an optical fiber structure to Experimental Example of the present disclosure as a saturable absorber in an optical fiber ring laser and experimental result graphs thereof.

Figure 5A:
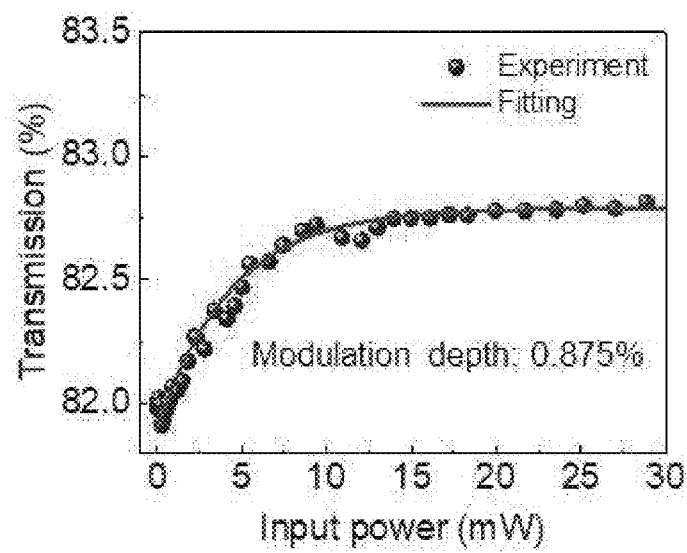
FIGS. 5A to 5E are a laser setup employing an optical fiber structure including conformal graphene according to Experimental Example of the present disclosure as a saturable absorber in an optical fiber ring laser and experimental result graphs thereof.
Figure 5B:
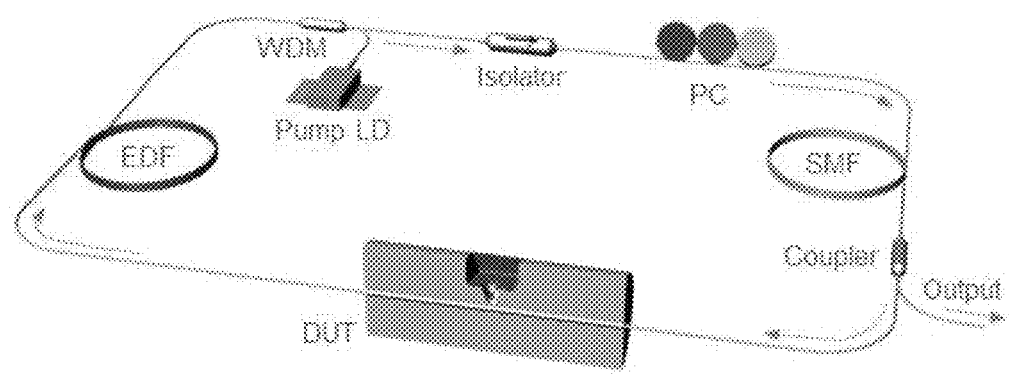

FIG. 5B illustrates the laser setup employing the optical fiber structure according to Experimental Example of the present disclosure as the saturable absorber in the ring laser. The optical fiber structure deposited with graphene by the ACS process was employed as the saturable absorber in the optical fiber ring laser to generate passive mode-locked pulses in a high-speed band as a nonlinear optical device.

An optical fiber ring laser including an erbium-doped optical fiber amplifier (EDFA) as an amplification medium was driven as a continuous wave at a wavelength showing the lowest optical loss as a result of laser propagation in a resonator when there is no saturable absorber.

In the time domain of the continuous wave, the ACS graphene nonlinear device, which is the optical fiber structure of this Experimental Example, is a device which filters low-intensity laser modes and aligns a phase between the passing high-intensity modes to convert the continuous wave into pulses and stabilize the pulses. This will be described by the Haus master equation of pulse delivery in the laser resonator.

$$\frac{1}{T_R}\frac{\partial}{\partial T}a = (g-l)a + \left(\frac{1}{\Omega_f^2} + jD\right)\frac{\partial^2}{\partial t^2}a + (\gamma - j\delta)|a|^2 a$$

Here, $T_R$, g, l, $\Omega_f$, D, $\gamma$, and $\delta$ are a round trip time in the ring resonator, gain per round trip time, loss per round trip, a modulation frequency, group velocity dispersion (GVD), a self-amplitude modulation coefficient, and a Kerr coefficient, respectively.

At a power in the resonator of 58.7 mW, laser modes with intensity higher than a saturable absorber threshold value survive through the saturable absorber and show periodic constructive interference between these modes to form pulses.

Figure 5C:
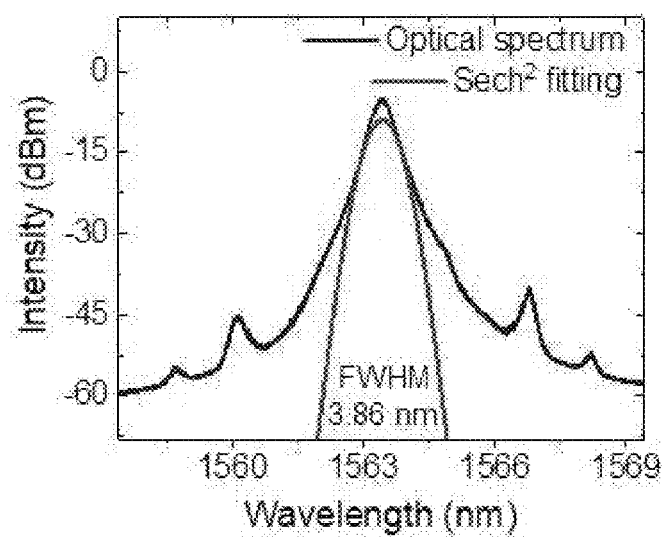
Figure 5D:
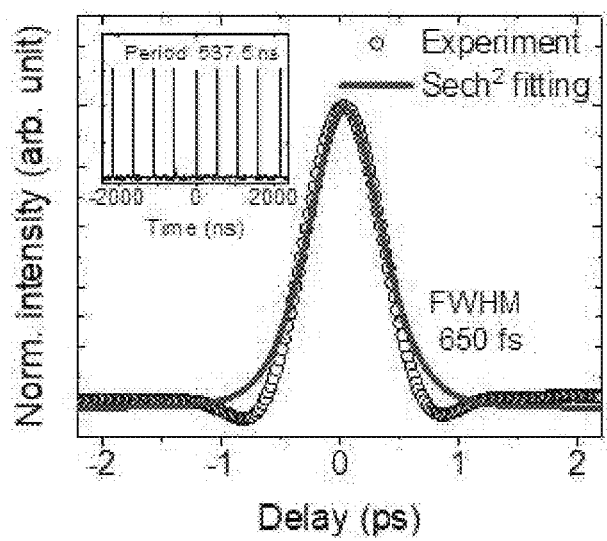
Figure 5E:
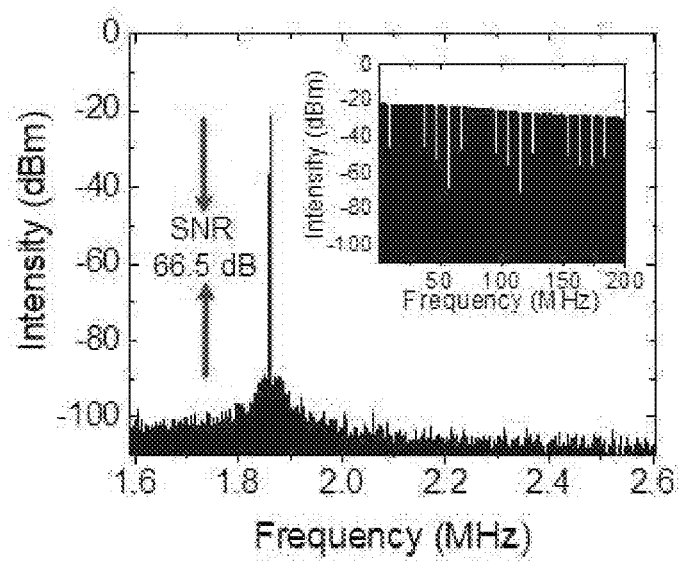

According to FIGS. 5C to 5E, detailed laser output characteristics show a power in the resonator of 67.1 mW with a polarization state optimized by a polarization controller located in the fiber laser resonator.

Referring to FIG. 5C, in this spectral region, a Kelly-sideband peak caused by periodic perturbation of the laser gain and loss is observed. These are typical soliton pulses observed at powers in all resonators of 58.7 to 82.6 mW. Appearing at the same spacing of the Kelly peak pair from the central wavelength of the pulse demonstrates that mode-locked pulses have the characteristics soliton pulses.

In the measurement of the autocorrelation (AC) characteristic of the pulses in a time region of FIG. 5D, the pulses exhibit a full width at half maximum (FWHM) of 650 fs, assuming sech$^2$ profiles.

A duration of the soliton pulse should satisfy $$\tau > \sqrt{(L\beta_2)}.$$

Here, $\beta$ and L denote the GVD and a length of the laser resonator, respectively. In order to balance total chromatic dispersion, these are necessary for the generation of very short wave soliton pulses by the Haus Master equation. A single-mode fiber (SMF, Corning-28) of 53.8 m is added in the resonator to control chromatic dispersion. The resonator total chromatic dispersion of the laser is calculated to be 0.692 ps nm$^{-1}$.

An oscilloscope trace shown in FIG. 5D illustrates a pulse train in nano time units (537.5 ns) with a repetition rate of 1.86 MHz. This consistently corresponds to the resonator length.

FIG. 5E illustrates a narrowband radio frequency spectrum of a main peak. A high signal-to-noise ratio of 66.55 dB is measured at 1.86 MHz which is the same frequency measured on the oscilloscope, to indicate a stable operation of the soliton pulses.

A broadband spectrum (up to 200 MHz) was measured as shown in the inner drawing in FIG. 5E. No unnecessary modulation on the spectrum was found. This means there is no Q-switching instability.

A threshold value of the power in the resonator for the pulse formed by this device was 58.7-82.6 mW. No damage or loss of the graphene was found in a power range of an available laser diode (LD) pump.

FIGS. 6A to 6D are various experimental results for confirming the characteristics in the case in which the optical fiber structure according to Experimental Example of the present disclosure is applied as a saturable absorber device.

Figure 6A:
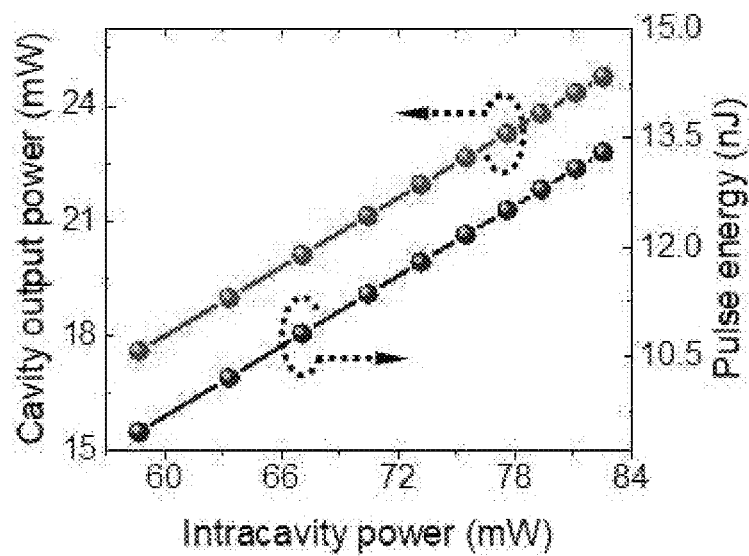
FIGS. 6A to 6D are various experimental results for confirming the characteristics in the case in which the optical fiber structure according to Experimental Example of the present disclosure is applied as a saturable absorber device.

Referring to FIG. 6A, with respect to the power in the resonator, output power and the pulse energy are linearly proportional. This indicates that lasing outputting the soliton is stable, and no pulse breakage or separation occurs within a resonator power operating region.

Maximum output power and pulse energy were recorded as 24.77 mW and 13.32 nJ, respectively, for the power in the resonator of 82.6 mW, which indicates a potential of the saturable absorber device manufactured for high-energy ultrafast pulse laser application. The slope efficiency of the laser was calculated to be 18%. A repetition rate of the pulse train did not change during a power tuning process, and this is an expected characteristic of an ideal mode-locked laser.

Beyond the power in the resonator of 82.6 mW, mode locking disappears. This is seen to be the result of an imbalance between nonlinearity and the chromatic dispersion within the resonator resulting in the separation or breakage of the pulses.

A low-loss saturable absorber device plays an important role in achieving the minimum loss in the resonator and the maximum optical power when combined with a gain medium.

Figure 6B:
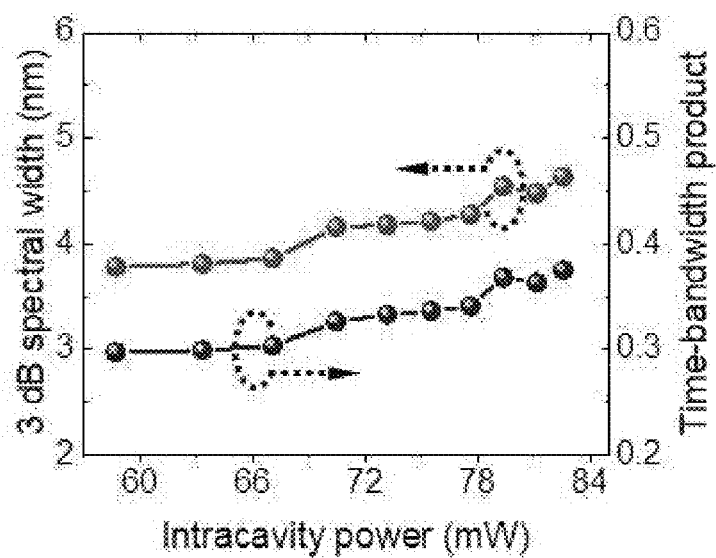

In FIG. 6B, a 3-dB spectral width (red curve) and a time-bandwidth product (TBP; blue curve) are shown for the power in the resonator. The average 3-dB spectral width and TBP were calculated as 4.19 nm and 0.334 in an intracavity power region of 58.7 to 82.6 mW, respectively. This TBP value is interpreted as due to the chirp of the pulse. No optical or thermal damage was found during this test, and this indicates high stability of the laser resonator in addition to the saturable absorber device as a whole.

Figure 6C:
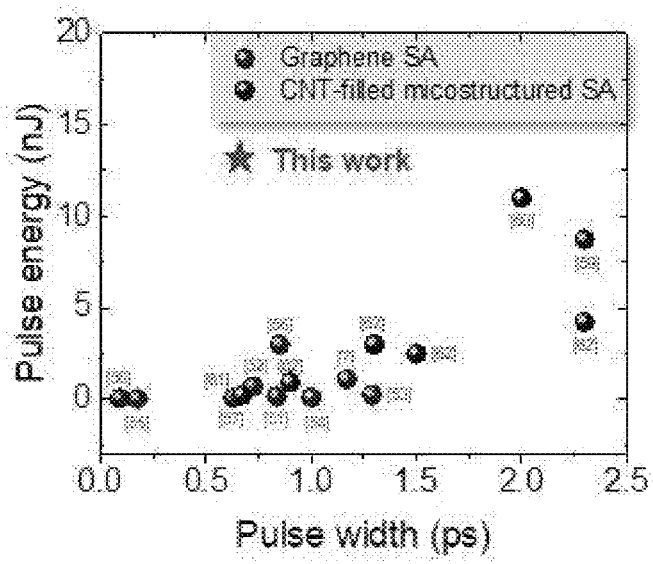

FIG. 6C is a graph for comparing the performance of the device according to Experimental Example of the present disclosure and a device disclosed by the related art. The maximum pulse energy output by this device was measured up to 13.32 nJ at a pulse duration of 650 fs. This is a higher numerical value compared to the related art.

Figure 6D:
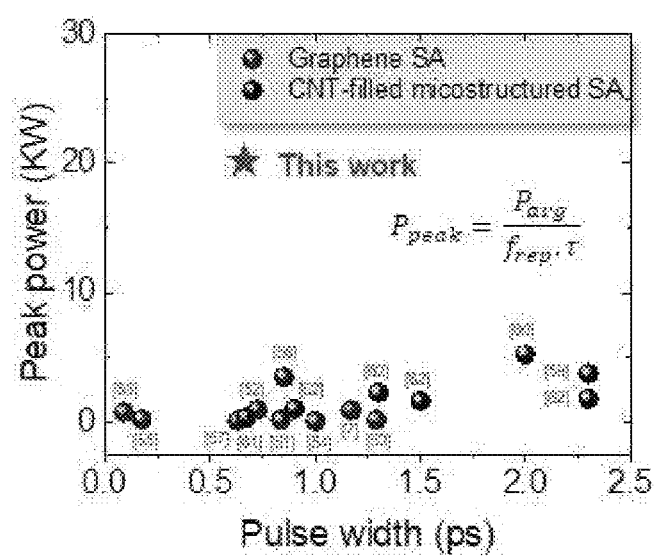

FIG. 6D illustrates the comparison of the peak power vs the pulse width in order to confirm the performance of the present device and devices according to the related art, respectively. For this device, a high peak power of 20.17 kW was acquired. Long-term stability performance of the mode-locked laser is practically important for the application of the present device, and the laser output was continuously monitored at 30-minute intervals for 2 hours per day for 1 week for proof. During a measurement period, a 3-dB spectral width and a center wavelength did not show notable changes at a power of 67.1 mW in the resonator.

The value shifted from 1563.44 nm to 1563.45 nm, which indicates a change of 0.55% in the stability test. Also, the 3-dB change was measured from 3.85 nm to 3.92 nm (change rate of 2.8%).

Figure 7:
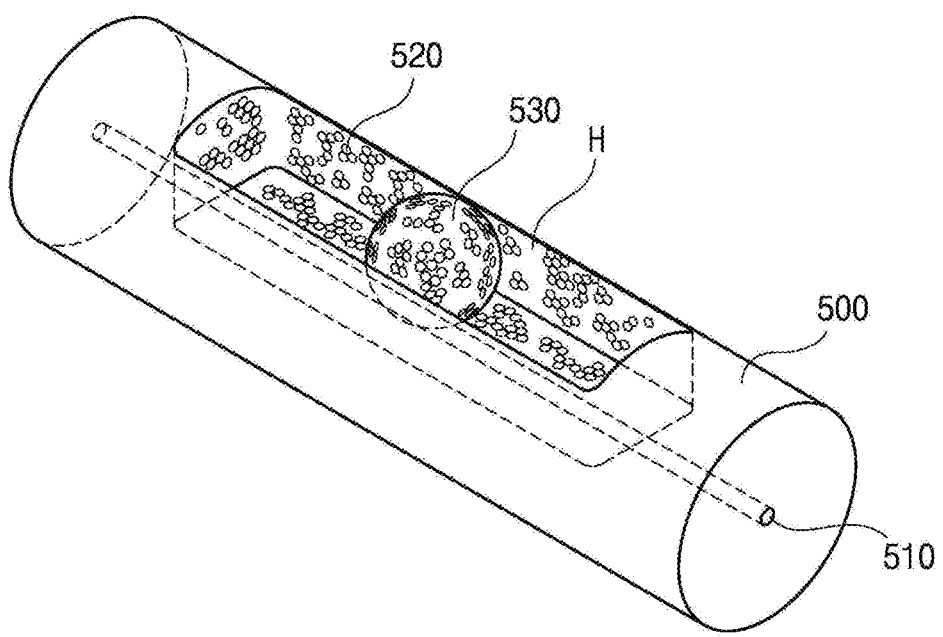
FIG. 7 illustrates a schematic partial perspective view of an optical device according to a third embodiment of the present disclosure.

FIG. 7 illustrates a schematic partial perspective view of an optical device according to a third embodiment of the present disclosure.

An optical device structure includes a three-dimensional micro hole structure H formed in a clad part 500 in an optical fiber including a core part 510 and the clad part 500. Further, the surface of the three-dimensional micro hole structure H includes a graphene layer 520.

For convenience of description, differences from the first embodiment will be mainly described. The difference from the first embodiment is that an optical component 530 is further included in the three-dimensional micro hole structure. One example of the optical component is a microscopic spherical device.

When the fine spherical device 530 is located within a range which may interact with light which proceeds in the optical fiber, some of the laser which proceeds through an optical fiber core proceeds in a circular shape along a surface of the device 530, and this laser meets the following light which proceeds through the optical fiber core again and causes periodic constructive and destructive interference to show periodic resonant wavelengths in the spectrum.

Like the above, when the ACS graphene according to the present disclosure is coated on the surface of complicated structure, a resonance wavelength may be changed according to power of single or multiple incident light due to the optical nonlinearity and optothermal effect of the graphene. This change of the resonance wavelength may be used for optical switching.

The graphene coated by an ACS process is formed on the surface of the three-dimensional micro hole structure or is also formed on the surface of the spherical device to be added, and thus an interaction between the laser which proceeds along the surface of the spherical device and graphene coated on a curved surface may be used. When an additional pump laser is injected into a switching device having this structure, or electricity passes from the outside to control an intrinsic Fermi energy level of the graphene and the real and imaginary parts of a refractive index, light channel switching may be variously performed.

Figure 8:
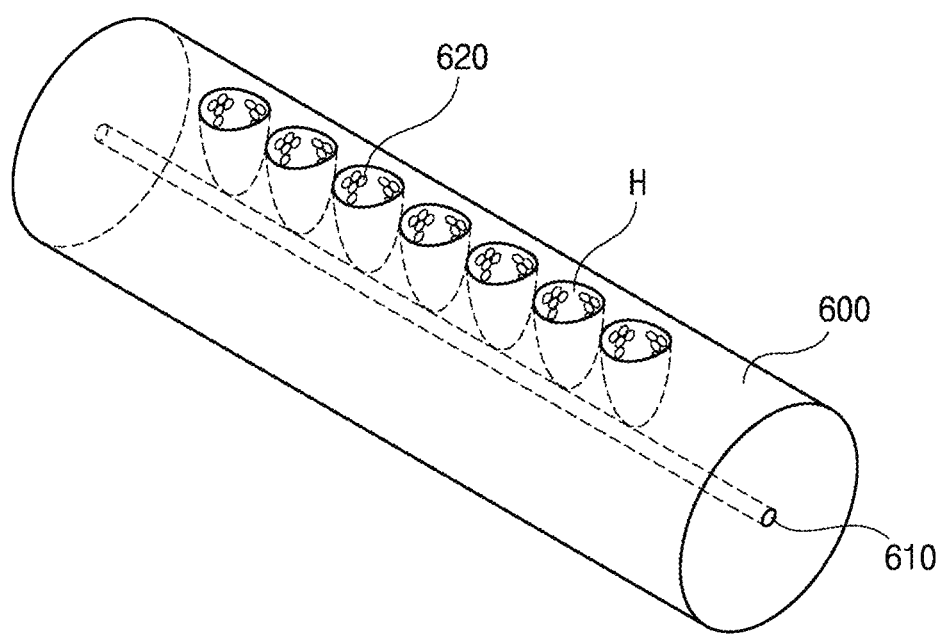
FIG. 8 illustrates a schematic partial perspective view of an optical device according to a fourth embodiment of the present disclosure.

FIG. 8 illustrates a schematic partial perspective view of an optical device according to a fourth embodiment of the present disclosure.

An optical device structure includes a three-dimensional micro hole structure H formed in a clad part 600 in an optical fiber including a core part 610 and the clad part 600. Further, the surface of the three-dimensional micro hole structure H includes a graphene layer 620.

Referring to FIG. 8, the three-dimensional micro hole structure is composed of a plurality of small holes H, and the graphene layer is provided on surfaces of the plurality of small holes. The plurality of small holes may constitute a grating device.

When a periodic microstructure is manufactured as shown in FIG. 8 within a range which may interact with light which proceeds in the optical fiber, a grating device which reflects only a specific wavelength backward may be manufactured, and fiber Bragg grating (FBG) may be implemented in a period of a nanometer range, and long period grating (LPG) may be implemented in a period of a micrometer range, and various types which are not particularly limited in addition may be implemented.

Here, when graphene is coated along a complicated surface by the ACS process, a wavelength reflected according to power of incident light changes, and this is also a result of using optical nonlinearity of the graphene.

Since it is possible to change an effective refractive index of the above-described device even by flowing a current to the uniformly coated ACS graphene and controlling the ACS graphene, the reflected wavelength by the current may also be controlled.

According to the present disclosure, a structure with an optimized depth, length, and surface condition can be very effectively manufactured by a process of manufacturing a micro hole structure proposed in the present disclosure.

According to the present disclosure, there is an effect in that a structure in an optical fiber coated with a conformal graphene layer optimizes an efficient nonlinear interaction of laser-graphene and thus a high-power laser operation can be performed.

In the related art, there was no method for coating graphene in a micro hole structure, but when an atomic carbon spray (ACS) process proposed in the present disclosure is used, there is an effect that graphene can be directly synthesized even in a deep structure, and thus an interaction with a laser passing through a periphery of the deep structure can be induced.

Although the above-described preferred embodiments according to the present disclosure have been described, the present disclosure is not limited thereto, it is possible to perform out various modifications within the scope of the claims, the detailed description of the invention, and the accompanying drawings, and the above belongs to the present disclosure.

What is claimed is:

1. An optical device structure, comprising:
an optical fiber including a core part, a clad part, and a three-dimensional micro hole structure in the clad part,
wherein a surface of the three-dimensional micro hole structure is provided with at least a non-flat surface,
a conformal graphene layer is formed on the surface of the three-dimensional micro hole structure, and
the conformal graphene layer is formed through nucleation and growth on a target base material surface by diffusion of carbon atoms generated through decomposition of a carbon precursor by a catalytic action on a non-metal layer.

2. The optical device structure of claim 1, wherein a shape of the three-dimensional micro hole structure, a distance between the three-dimensional micro hole structure and the core part, and/or the surface on which the conformal graphene layer is formed are controlled to optimize a nonlinear interaction between a laser which proceeds along the core part of the optical fiber and the conformal graphene layer coated on the surface of the three-dimensional micro hole structure.

3. The optical device structure of claim 1, wherein:
the three-dimensional micro hole structure includes a first hole formed in a surface of the optical fiber and a second hole connected to the first hole and adjacent to the core part; and
the second hole occupies a smaller region than the first hole.

4. The optical device structure of claim 1, wherein the three-dimensional micro hole structure is additionally provided with an optical component therein.

5. The optical device structure of claim 1, wherein the three-dimensional micro hole structure is composed of a plurality of small holes, and the graphene layer is provided on surfaces of the plurality of small holes and thus a grating device is implemented.

6. The optical device structure of claim 1, wherein the conformal graphene layer functions as a saturable absorber.

7. The optical device structure of claim 1, wherein the optical device structure functions as a mode locker configured to fix phases of laser modes progressing in a laser resonator, and generates a pulse in femtosecond ($10^{-15}$ second) units.

8. A method of manufacturing an optical device structure, comprising
disposing an optical fiber including a core part, a clad part, and a three-dimensional micro hole structure in the clad part;
forming a graphene layer on a surface of the three-dimensional micro hole structure, which is an operation of forming a non-metal layer on a dummy substrate;
disposing the optical fiber so that the non-metal layer on the dummy substrate faces the three-dimensional micro hole structure; and
synthesizing a graphene film by injecting a carbon precursor to form graphene on the surface of the three-dimensional micro hole structure,
wherein nucleation and growth of the graphene is performed on a surface of an application target of the graphene through decomposition of the carbon precursor,
the carbon precursor is supplied with energy of a metastable site of the non-metal layer for decomposition, and is decomposed into carbon atoms on a surface of the non-metal layer to form the graphene,
the surface of the three-dimensional micro hole structure is provided with at least a non-flat surface, and
a conformal graphene layer is formed on the surface of the three-dimensional micro hole structure.

9. The method of claim 8, wherein:
the three-dimensional micro hole structure includes a first hole formed in a surface of the optical fiber and a second hole connected to the first hole and adjacent to the core part; and
the second hole occupies a smaller region than the first hole.

10. The method of claim 8, wherein the three-dimensional micro hole structure is additionally provided with an optical component therein.

11. The method of claim 8, wherein:
the three-dimensional micro hole structure is composed of a plurality of small holes; and
the graphene layer is provided on surfaces of the plurality of small holes and thus a grating device is implemented.

12. The method of claim 8, wherein:
the dummy substrate is a silicone substrate in which a V-shaped groove is formed, and the non-metal layer is formed on a surface of the V-shaped groove.

13. The method of claim 8, wherein the non-metal layer is made of gamma (γ) alumina.

* * * * *